(12) United States Patent
Andersson

(10) Patent No.: US 11,459,978 B2
(45) Date of Patent: Oct. 4, 2022

(54) PISTON ARRANGEMENT FOR A CLEAN COMBUSTION ENGINE

(71) Applicant: VOLVO TRUCK CORPORATION, Gothenburg (SE)

(72) Inventor: Arne Andersson, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/454,144

(22) Filed: Nov. 9, 2021

(65) Prior Publication Data
US 2022/0154667 A1 May 19, 2022

(30) Foreign Application Priority Data
Nov. 17, 2020 (EP) .................................... 20207979

(51) Int. Cl.
*F02F 3/28* (2006.01)
*F01M 1/02* (2006.01)
(Continued)

(52) U.S. Cl.
CPC .................. *F02F 3/28* (2013.01); *F01M 1/02* (2013.01); *F01M 1/16* (2013.01); *F01M 11/02* (2013.01); *F01N 3/005* (2013.01); *F02M 21/0209* (2013.01); *F16J 9/12* (2013.01); *F01M 2001/0207* (2013.01)

(58) Field of Classification Search
CPC .... F02F 3/28; F01M 1/02; F01M 1/16; F01M 11/02; F01M 2001/0207; F02M 21/0209; F01N 3/005
See application file for complete search history.

(56) References Cited

U.S. PATENT DOCUMENTS

| 2,194,102 A | 3/1940 | Taylor |
| 2,356,909 A | 8/1944 | Aske |

(Continued)

FOREIGN PATENT DOCUMENTS

| CN | 110685827 A | 1/2020 |
| EP | 1977098 A1 | 10/2008 |

(Continued)

OTHER PUBLICATIONS

European Search Report dated May 19, 2021 in corresponding European Patent Application No. 20207979.4, 5 pages.

*Primary Examiner* — Syed O Hasan
(74) *Attorney, Agent, or Firm* — Venable LLP; Jeffri A Kaminski

(57) ABSTRACT

A piston arrangement for a clean combustion engine, such as a hydrogen engine. The piston arrangement comprises a piston configured for reciprocal movement inside a cylinder having a cylinder wall, the piston having a piston head configured to face a first compartment with pressurized gas, a sealing arrangement comprising at least one sealing ring configured to be arranged to seal the piston to the cylinder wall and separating the first compartment from a second compartment, and a water channel extending from an interior of the piston to the sealing ring to provide water for lubricating the sealing ring. The piston head comprises a pumping element configured to be arranged to pressurize the water in the water channel by pressurised gas in the first compartment.

12 Claims, 4 Drawing Sheets

(51) Int. Cl.
  *F01M 1/16* (2006.01)
  *F01M 11/02* (2006.01)
  *F01N 3/00* (2006.01)
  *F02M 21/02* (2006.01)
  *F16J 9/12* (2006.01)

(56) References Cited

U.S. PATENT DOCUMENTS

| | | | |
|---|---|---|---|
| 4,474,106 A * | 10/1984 | Durenec | F16J 9/08 92/159 |
| 2004/0221821 A1 | 11/2004 | Taxon | |
| 2007/0193443 A1 * | 8/2007 | Adolfsson | F16J 9/08 123/41.38 |
| 2008/0099002 A1 | 5/2008 | Boyer et al. | |
| 2008/0125955 A1 | 5/2008 | Boyer et al. | |
| 2011/0000206 A1 * | 1/2011 | Aprad | F24V 99/00 165/45 |
| 2012/0029795 A1 | 2/2012 | Surnilla et al. | |
| 2012/0067325 A1 | 3/2012 | Wathieu et al. | |
| 2014/0102403 A1 | 4/2014 | Yoshihara et al. | |
| 2014/0331668 A1 | 11/2014 | Bidner et al. | |
| 2014/0331970 A1 | 11/2014 | Bidner et al. | |
| 2018/0252105 A1 | 9/2018 | Gaj-Jablonski | |

FOREIGN PATENT DOCUMENTS

| | | |
|---|---|---|
| GB | 345313 A | 3/1931 |
| GB | 439301 A | 12/1935 |
| GB | 736279 A | 9/1955 |
| JP | H06159087 A | 6/1994 |
| WO | 2007056832 A1 | 5/2007 |
| WO | 2007085897 A1 | 8/2007 |
| WO | 2018065594 A1 | 4/2018 |

* cited by examiner

PISTON ARRANGEMENT FOR A CLEAN COMBUSTION ENGINE

TECHNICAL FIELD

The present invention relates to a piston arrangement for a clean combustion engine, such as a hydrogen engine. The invention further relates to a clean combustion engine, such as a hydrogen engine, and a vehicle. The invention is applicable on vehicles, in particularly heavy vehicles, such as e.g. trucks. However, although the invention will mainly be described in relation to a truck, the piston arrangement and clean combustion engine are also applicable for other type of vehicles, such as cars, industrial construction machines, wheel loaders, etc.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

In order to meet the described demands, various engine concepts have been developed throughout the years where conventional combustion cylinders have been combined with e.g. a pre-compression stage and/or an expansion stage. Other engine concepts relates to the fuel used and combusted in the combustion engine. For example, gasoline and diesel can be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically).

However, even though the engine is subject to adaptations in order to operate on the new fuel, certain parts of the engine, e.g. the lubrication of the reciprocating piston in the cylinder, is often kept relatively unchanged. For a hydrogen engine, lubrication oil slipping to the combustion chamber may be a source for particulates. There is thus a need in the industry for an improved combustion engine.

SUMMARY

It is an object of the present invention to at least to some extent alleviate the shortcomings discussed above in relation to known combustion engines, and to improve at least some aspects of the sealing arrangement between the piston and the cylinder.

According to at least a first aspect of the present invention, a piston arrangement for a clean combustion engine, such as a hydrogen engine, is provided. The piston arrangement comprising:

- a piston configured for reciprocal movement inside a cylinder having a cylinder wall, the piston having a piston head configured to face a first compartment with pressurized gas,
- a sealing arrangement comprising at least one sealing ring configured to be arranged to seal the piston to the cylinder wall and separating the first compartment from a second compartment,
- a water channel extending from an interior of the piston to the sealing ring to provide water for lubricating the sealing ring,
- wherein the piston head comprises a pumping element configured to be arranged to pressurize the water in the water channel by pressurised gas in the first compartment.

Hereby, the piston is lubricated in the cylinder using only water as lubricant which is pressurized by the gas in the first compartment, the first compartment typically being the combustion chamber. Thus, no external pressurization of the lubricating water is needed. Moreover, as the pumping element is held within the piston which is arranged close to the sealing arrangement and the sealing ring, the lubricating water is pressurized close to its point of application, avoiding excessive pressure losses otherwise occurring. Also, sealing water is simpler to achieve compared to sealing gas.

According to at least one example embodiment, the clean combustion engine is arranged and configured to combust a hydrogen-based fuel producing water as by-product in the exhausts, wherein the piston arrangement is arranged to utilize the by-product water in the water channel to lubricate the sealing ring.

Thus, the lubrication of the piston in the cylinder is self-contained in relation to the operation of the clean combustion engine, as the lubricating water is produced as a by-product during combustion, and is pressurized by the pressurized gas in the first compartment. In other words, no external addition of lubricant or the pressurization thereof is needed.

According to at least one example embodiment, the pumping element is prestressed and movably integrated in the piston head for compressing the water in the water channel.

Thus, a simple but yet effective means for pressurizing the lubricating water is provided.

According to at least one example embodiment, the pumping element comprises a first surface arranged and configured to receive a pressure from the pressurized gas inside the first compartment, and comprises a second surface opposite to the first surface, facing the water in the water channel. By providing a spring element between the first and second surfaces, the pumping element can transfer the pressure acting on the first surface from the pressurized gas, to a compressing force of the water in the water channel via a pressure from the second surface. Preferably, the pumping element comprises a disk-shaped element, or an element shaped as a cylinder, comprising the first and second surfaces.

According to at least one example embodiment, the water channel comprises a plurality of channel portions extending from the pumping element to an outer periphery of the piston.

Thus, effective sealing of the sealing arrangement is provided. The channel portions may be arranged as separate channel legs extending from a center cavity of the water channel, the center cavity being subject to the pumping element and pressurization of the water. Preferably, the channel portions, or channel legs, are evenly distributed in the circumferential direction of the piston.

According to at least one example embodiment, the piston arrangement further comprises a water supply for supplying water to the water channel, and a check valve arranged internally of the piston downstream of the water supply.

Thus, with reference to the above mentioned embodiment comprising a plurality of channel portions, the check valve is arranged between the center cavity and the water supply. By arranging the check valve internally of the piston, the check valve is arranged relatively close to the pressurisation of the lubricating water by the pumping element.

The water supply may be arranged to supply water from a product stream downstream of the clean combustion engine, as will be described later. For example, the water supply is originating from a condenser, e.g. comprised in an exhaust gas recirculation, EGR, system of the clean combustion engine.

According to at least one example embodiment, the water channel comprises an outlet arranged and configured to discharge water into the second compartment.

Thus, the lubricating water, which is pressurized by means of the pumping element, is brought into contact with at least the sealing ring arranged between the first and second compartment. Preferably, the second compartment is smaller than the first compartment by at least one magnitude. With reference to the above mentioned embodiment comprising a plurality of channel portions, or channel legs, each channel leg comprises an outlet arranged and configured to discharge water into the second compartment.

According to at least one example embodiment, the pumping element is configured to pressurise the water to a corresponding pressure as the pressurized gas in the first compartment.

Hereby, the sealing ring separating the first compartment from the second compartment is pressure equalized, and does not need to handle any pressure differences. Stated differently, the pressure over the sealing ring is balanced, and may seal to the first compartment with a relatively low seal friction as compared to if the lubricating water would not be pressurised to correspond to the pressure of the pressurized gas in the first compartment (that is, the sealing ring is subject to the pressurized gas on one side, and the pressurized water on the other side).

According to at least one example embodiment, the pumping element is configured to pressurise the water to 80%-120% of the pressure of the pressurized gas in the first compartment.

According to at least one example embodiment, the sealing ring is a first sealing ring and the sealing arrangement comprises a second sealing ring configured to be arranged to seal the piston to the cylinder wall and separating the second compartment from a third compartment.

Hereby, an improved sealing of the piston to the cylinder wall is provided. For example, the first sealing ring is top seal, and the second sealing ring is a secondary seal arranged further from the first compartment compared to the top seal.

According to at least one example embodiment, the water channel has a main extension in a fluid flow direction, and a cross section perpendicular to the main extension enclosed of internal walls of the piston.

Thus, the water in the water channel may be adequately pressurized and easily transported to the sealing arrangement.

According to at least one example embodiment, the piston arrangement is an oil-free piston arrangement.

In other words, no lubricating oil is used to seal the piston to the cylinder wall. Thus, any disadvantage related to the use of lubrication oil is avoided, e.g. the production of soot or particles as lubricating oil is leaked into the first compartment where it is combusted.

As previously mentioned, the first compartment may according to at least one example embodiment be the combustion chamber, wherein the combustion chamber is comprised in the cylinder above the head of the piston. Thus, the clean combustion engine is typically configured to compress the gaseous fuel, e.g. hydrogen or a hydrogen-based fuel, to achieve a compression ignition. The clean combustion engine may simply be referred to as an internal combustion engine.

According to at least a second aspect of the invention, a clean combustion engine, such as a hydrogen engine, is provided. The clean combustion engine comprises a piston arrangement according to the first aspect of the invention, and a cylinder in which the piston is reciprocally arranged.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

According to at least one example embodiment, the clean combustion engine is arranged and configured to combust a hydrogen-based fuel producing water as by-product in the exhausts, wherein the piston arrangement is arranged to utilize the by-product water in the water channel to lubricate the sealing ring.

Thus, the water as by-product is used as lubricating water, and the lubrication of the piston in the cylinder is self-contained in relation to the operation of the clean combustion engine, as described in relation to the first aspect of the invention.

According to at least one example embodiment, the piston is a dual acting piston acting on a first side for combustion action, and a on a second side opposite to the first side, for compression action.

Such dual acting piston is particularly advantageous for a clean combustion engine, and the water lubrication may be arranged space-efficiently.

According to at least a third aspect of the invention, a vehicle comprising a clean combustion engine according to the second aspect of the invention is provided.

According to at least one example embodiment, the vehicle comprises a condenser arranged in downstream fluid communication with the clean combustion engine for receiving the exhausts, the condenser being configured to condense the exhausts to form a condensate of liquid water, wherein the liquid water is used in the water channel to lubricate the sealing ring.

Thus, the liquid water of the condensate, which originally is a by-product of the combustion in the clean combustion engine, is used as lubricating water.

The condenser may e.g. be comprised in an exhaust gas recirculation, EGR, system of the vehicle.

Further advantages and features of the present invention are disclosed and discussed in the following description and the accompanying drawings.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
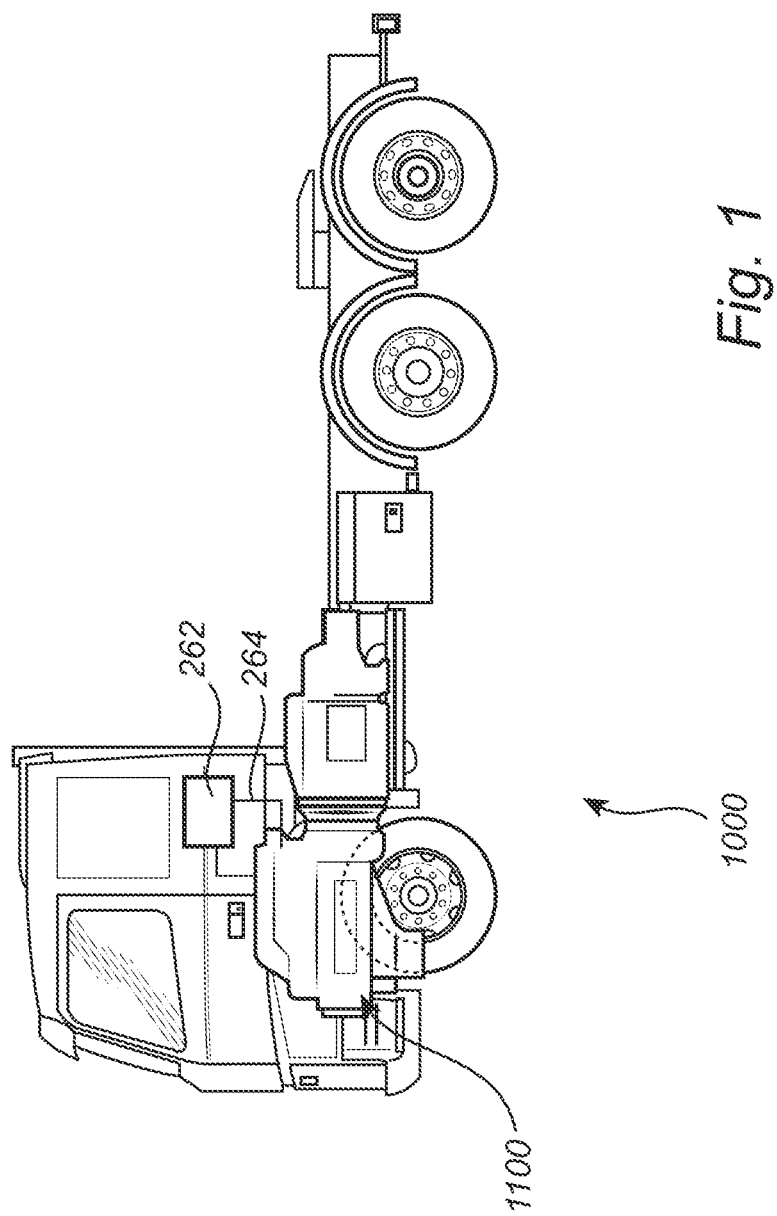
FIG. 1 is a side view of a vehicle comprising an internal combustion engine being a clean combustion engine according to an example embodiment of the present invention.

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a vehicle 1000 with an internal combustion engine 1100 according to the present invention. The vehicle 1000 depicted in FIG. 1 is a truck for which the inventive internal combustion engine 1100, which will be described in detail below, is particularly suitable for. However, the internal combustion engine 1100 may as well be implemented in other types of vehicles, such as in busses, light-weight trucks, passenger cars, marine applications etc. The internal combustion engine 1100 is here a clean combustion engine 1100 or clean engine 1100, and is operated on a gaseous fuel such as e.g. hydrogen, and may thus be referred to as a hydrogen or H2 engine.

Figure 2:
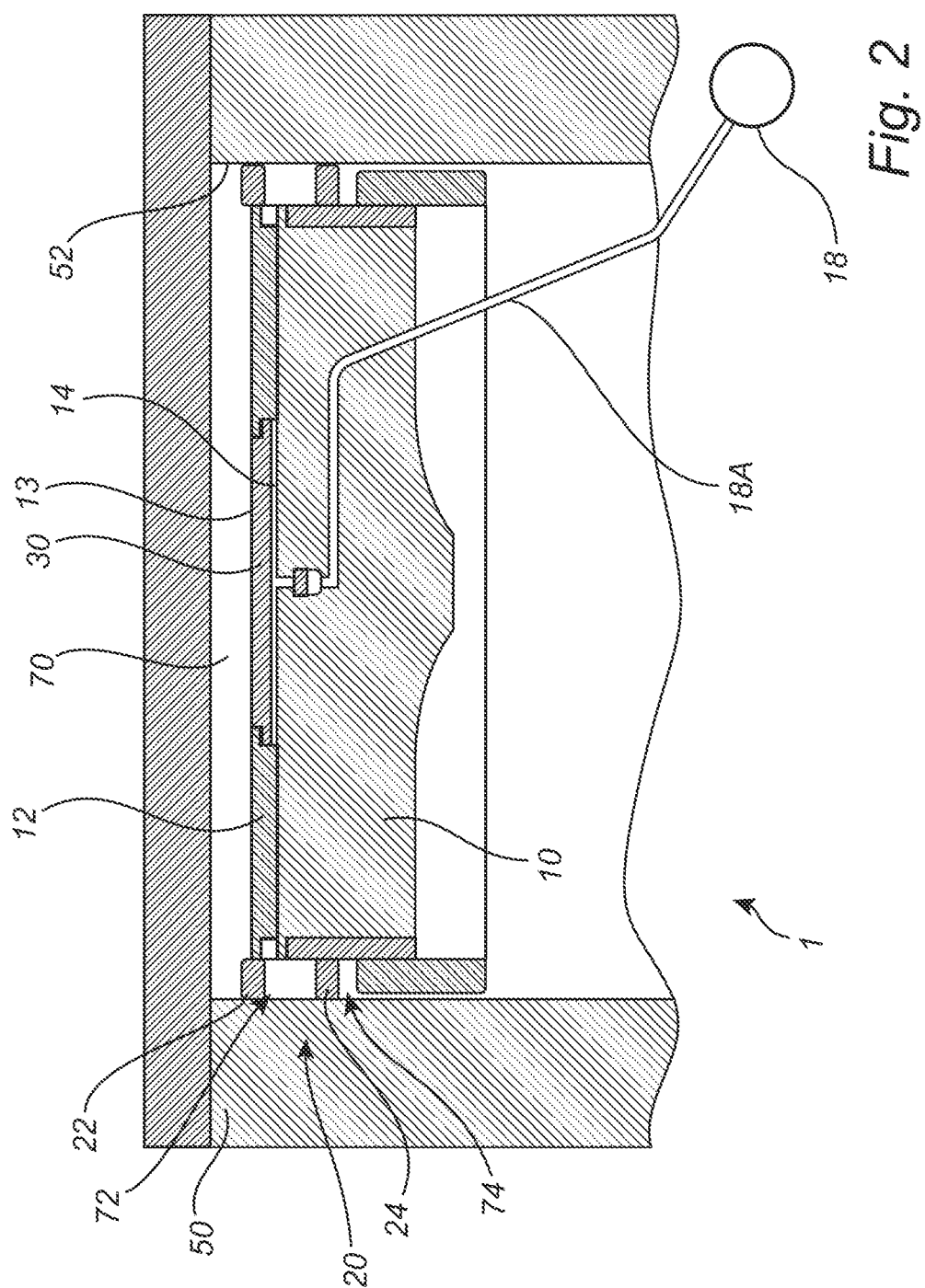
FIG. 2 is a schematic cross sectional side view of a piston arrangement being part of a clean combustion engine according to an example embodiment of the present invention.

FIG. 2 discloses a piston arrangement 1 which may be used in the clean combustion engine 1100 of FIG. 1. The piston arrangement 1 comprises a piston 10 and a cylinder 50 having a cylinder wall 52 defining a cylinder space in which the piston 10 is arranged to move reciprocally. The piston comprises a piston head 12 having a top surface 13 arranged and configured to face a first compartment 70 with pressurized gas, typically a combustion chamber in which gaseous fuel is combusted. Thus, the first compartment 70 is delimited of the cylinder wall 50 and the top surface 13 of the piston head 12. The piston arrangement 1 further comprises a sealing arrangement 20 including a first sealing ring 22 and a second sealing ring 24, both arranged to seal the piston 10 to the cylinder wall 52 such that the first sealing ring 22 separates the first compartment 70 from a second compartment 72, and the second sealing ring 24 separates the second compartment 72 from a third compartment 74. The first sealing ring 22 may thus act as a top seal 22, and the second sealing ring 24 as a secondary seal 24 or lower seal 24.

Figure 3:
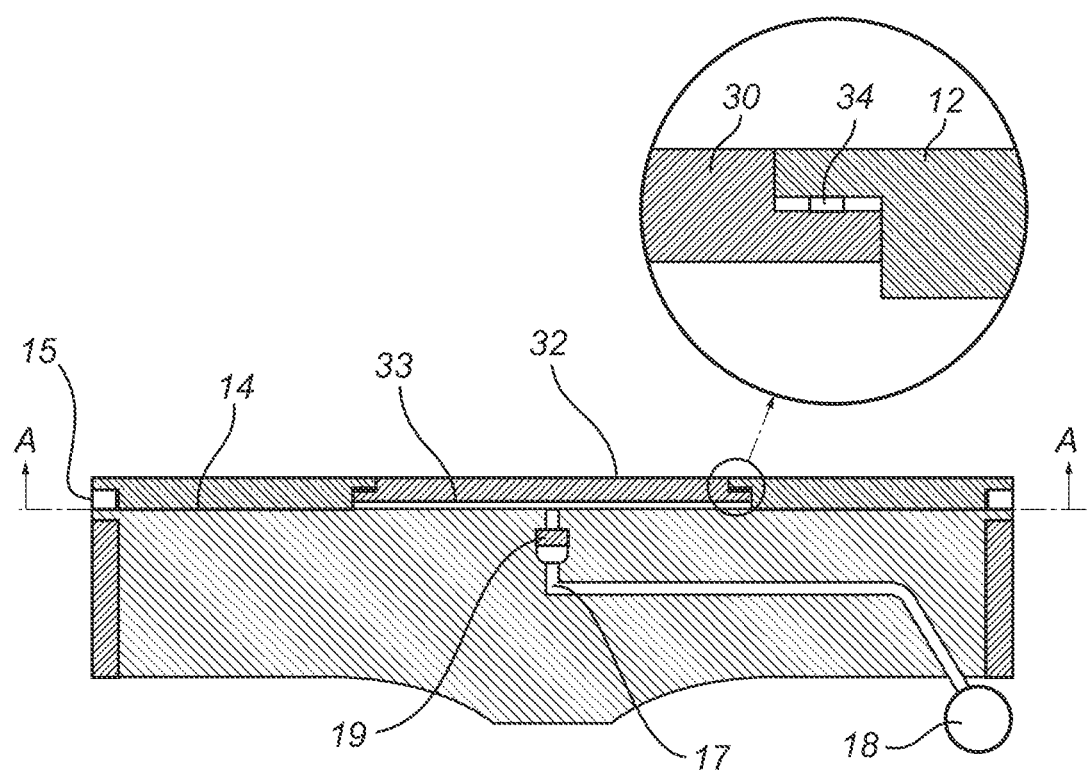
FIG. 3 is a schematic cross sectional side view of a detail of the piston arrangement of FIG. 2, according to an example embodiment of the present invention.

As is shown in FIG. 2 (and also in the enlarged portion of the piston 10 in FIG. 3), the piston arrangement 1 is configured to supply liquid to the sealing arrangement 20. The liquid is here water, and the piston arrangement 1 is thus configured to supply water to the sealing arrangement 20. The piston arrangement 1 comprises a water channel 14 extending from an interior of the piston 10 to at least the first sealing ring 22 to provide water for lubricating the sealing arrangement 20 and the first sealing ring 22. As shown in FIGS. 2 and 3, the water channel 14 comprises an outlet 15 arranged and configured to discharge water into the second compartment 72. For this purpose, the piston 10 further comprises pumping element 30 arranged and configured to pressurize the water in the water channel 14 by pressurised gas in the first compartment 70. The pumping element 30 is arranged centrally in an end portion of the piston head 12, the pumping element 30 having a first surface being arranged as a top surface portion 32 forming at least a part of the top surface 13 of the piston head 12, and having a second surface opposite to the first surface, the second surface being arranged as a bottom surface portion 33 facing the water channel 14. As better shown in FIG. 3, the pumping element 30 is prestressed by means of at least one spring element, here springs 34, or flow springs 34, shown in the enlarged part of FIG. 3 Thus, the pumping element 30 is movably integrated in the piston head 12 for compressing the water in the water channel 14. That is, the pumping element 30 may be moved within the limits of the springs 34, and the internal walls of the piston head 12 delimiting the movement of the pumping element 30.

The pumping element 30 operates as follows. The pressurized gas in the first compartment 70 acts on the top surface portion 32, whereby the prestressed and movably arranged pumping element 30 in response acts on the water in the water channel 14 via the bottom surface portion 33. In other words, the pumping element 30 can transfer the pressure acting on the top surface portion 32 from the pressurized gas, to a compressing force of the water in the water channel 14 via a pressure from the bottom surface portion 33. As the water channel 14 is arranged to provide a confined space for the water, the water will be pressurized by the acting force of the pumping element 30. The pumping element 30 may be configured to pressurise the water in the water channel e.g. to a corresponding pressure as the pressurized gas in the first compartment 70, or to a pressure of 80% to 120% of the pressurized gas. Hereby, the pressure over the first sealing ring 22 is balanced, and may seal to the first compartment 70 with a relatively low seal friction, that is, the first sealing ring 22, here being a top seal 22, is subject to gas pressure of the pressurized gas on a first side (top side), and is subject to the pressurized water on an opposite, second side (bottom side). The second sealing ring 24, and any further sealing ring arranged adjacent to the second sealing ring, deals with the pressure difference to the surroundings.

Figure 4:
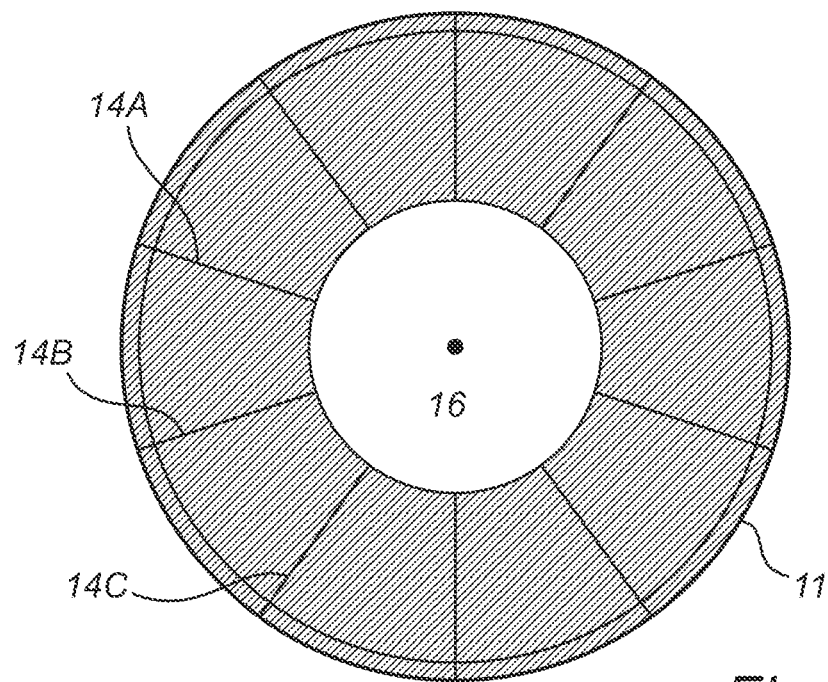
FIG. 4 is a cross sectional top view along line A-A of FIG. 3.

FIG. 4 is a cross section along line A-A of the piston head 12 of FIG. 3, showing the water channel 14 comprising a plurality of channel portions (of which only some 14A, 14B, 14C are indicated) shaped as channel legs extending from a centre channel chamber 16 or centre cavity 16 arranged below the pumping element 30, to an outer periphery 11 of the piston 10, and the sealing arrangement 20 (as shown in FIG. 2). In the example of FIG. 4, the water channel 14 comprises ten channel portions evenly distributed circumferentially along the piston head 12. It should be noted that the number of channel portions are exemplifying. It should be realized that there may be more channel portions water channel 14, but also fewer. However, all channel portions in the water channel 14 are members of the same water system, and are collaborating in performing the lubricating function of the sealing arrangement 20. The water channel 14 is thus arranged internally of the piston 10 or piston head 12, and comprises the centre cavity 16, extending from a water supply 18 to a respective outlet of the channel portions 14A, 14B, 14C. In other words, the water channel 14 may be referred to as a water tube 14, or liquid pipe 14. It should be understood that the water channel 14 is enclosed of internal walls of the piston 10 or piston head 12, and thus has a cross section perpendicular to a main extension which is delimited of the internal walls of the piston 10 or piston head 12. The main extension of the water channel 14 is typically extending in the same direction as the fluid flow direction of the water.

Turning back to FIG. 3, the water to the water channel 14 is provided by a water supply 18, here schematically indicated outside of the piston 10, for supplying water to the water channel 14 via a first channel part 17 (as seen in FIG. 2, via conduits 18A). Moreover, the piston head 12 further comprises a check valve 19 arranged internally of the piston head 12 and being configured to prevent reverse flow in the first channel part 17 of the water channel 14, downstream of the water supply 18. Thus, the water channel 14 can be divided into at least three parts, the first channel part 17 arranged downstream of the water supply 18 and regulated by the check valve 19, a second channel part being the centre channel chamber 16 or centre cavity 16 which is arranged such that the water therein is in contact with the bottom surface portion 33 of the pumping element 30 for pressurising the water, and a third channel part comprising one or more of the channel portions 14A, 14B, 14C with a respective outlet.

Figure 5:
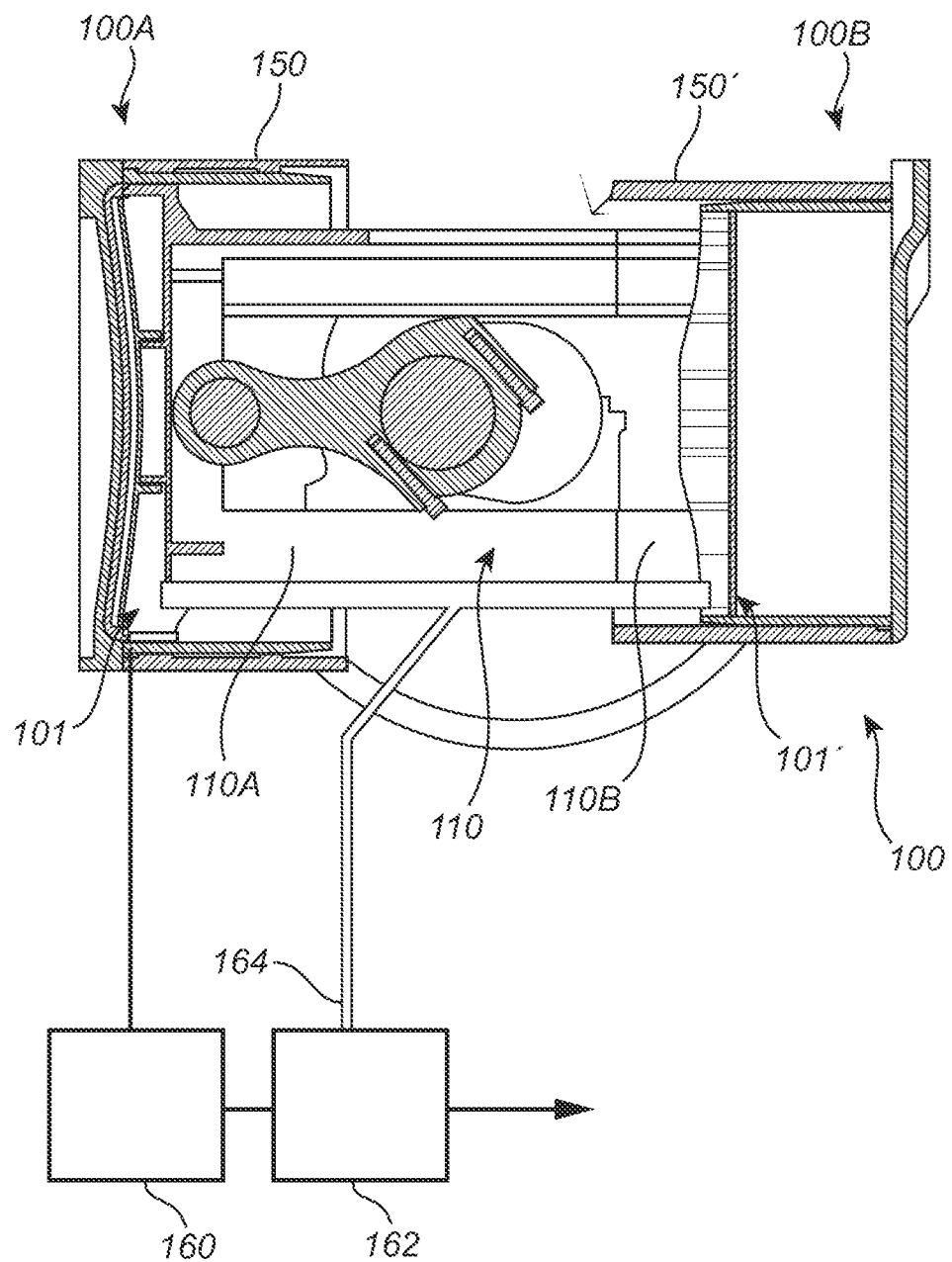
FIG. 5 is a schematic view of at least a part of a clean combustion engine according to yet another example embodiment of the invention.

FIG. 5 is showing an example embodiment of the invention being at least a part of an internal combustion engine 100, here a clean combustion engine 100 in the form of a hydrogen engine, or H2-engine 100, which may replace the clean combustion engine 1100 described with reference to FIG. 1. The internal combustion engine 100 comprises a first side 100A for combustion action, and a second side 100B opposite the first side 100A, for compression action. Each one of the first and second sides 100A, 100B comprises a piston arrangement 101, 101' and a cylinder 150, 150' corresponding to the piston arrangement 1 and cylinder 50 of FIGS. 2-4, respectively, which features and functions are not repeated here again. Thus, the piston 110 is a dual acting piston with a first piston portion 110A operating on the first side 100A, and a second piston portion 110B operating on the second side 100B, for reciprocal motion in the respective cylinder 150, 150'. It should be noted that only one dual piston arranged for reciprocal motion in the cylinders 150, 150' is shown in FIG. 5, but that the internal combustion engine 100 may comprise further such configurations.

As seen in FIG. 5, the clean combustion engine 100 comprises post combustion component(s) 160 comprising e.g. a secondary expander and a piston compressor (e.g. combined into one duo piston), and/or a heat exchanger (although not shown) arranged downstream of, and in fluid communication with the first side 100A (being a combustion side) for receiving exhaust gas from a combustion chamber. It should be understood that the post combustion component(s) 160 is only schematically indicated in FIG. 5 as being arranged downstream of the first side 100A. The heat exchanger may e.g. house a three-way catalytic converter. The heat exchanger and the three-way catalytic converter are operated known to those skilled in the art.

The clean combustion engine 100 of FIG. 5 further comprises a condenser 162 arranged in downstream fluid communication with the post combustion component(s) 160 for receiving exhaust gas, the condenser 162 is configured to condense the exhaust gas to form a condensate of liquid water. The condenser 162 is only shown schematically in FIG. 5. The condensate of liquid water may be used as the lubricating water in the water channel 14 as previously described, by utilizing a first conduit 164 configured to feed the respective sealing arrangement of the piston arrangements 101, 101'. However, it should be noted that other ways of supplying the lubricating water to the clean combustion engine 100, e.g. not using the condenser 162, is within the scope of the invention.

Returning to FIG. 1, an embodiment of a condenser 262 and a water conduit 264 for supplying liquid water of the condensate to the clean combustion engine 1100 is shown without the disclosure of a dual-acting piston as shown in FIG. 5. Thus, the clean combustion engine 1100 is arranged and configured to combust a hydrogen-based fuel producing water as by-product in the exhausts, wherein the piston arrangement in the clean combustion engine 1100 is arranged to utilize the by-product water in the water channel to lubricate the sealing arrangement (as shown in FIGS. 2-4), by means of the condenser 262 and water conduit 264. Thus, the water supply to the water channel 14 of FIGS. 2-4, may comprise the condenser 262.

It should be noted that the cylinder 50, 150, 150' may be considered as being a part of the piston arrangement 1, 101, 101', or may be considered to be external the piston arrangement 1, 101, 101' e.g. as a portion of an engine block housing.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A clean combustion hydrogen engines comprising: a cylinder having a cylinder wall; an oil-free piston arrangement, including: a piston configured for reciprocal movement inside the cylinder, the piston having a piston head configured to face a first compartment with pressurized gas, a sealing arrangement comprising at least one sealing ring configured to be arranged to seal the piston to the cylinder wall and separating the first compartment from a second compartment, a water channel extending from an interior of the piston to the sealing ring to provide water for lubricating the sealing ring, wherein the piston head comprises a pumping element configured to be arranged to pressurize the water in the water channel by pressurised gas in the first compartment, wherein the pumping element is prestressed and movably integrated in the piston head for compressing the water in the water channel.

2. The piston arrangement according to claim 1, the clean combustion engine being arranged and configured to combust a hydrogen-based fuel producing water as by-product in the exhausts, wherein the piston arrangement is arranged to utilize the by-product water in the water channel to lubricate the sealing ring.

3. The piston arrangement according to claim 1, wherein the water channel comprises a plurality of channel portions extending from the pumping element to an outer periphery of the piston.

4. The piston arrangement according to claim 1, further comprising a water supply for supplying water to the water channel, and a check valve arranged internally of the piston downstream of the water supply.

5. The piston arrangement according to claim 1, wherein the water channel comprises an outlet arranged and configured to discharge water into the second compartment.

6. The piston arrangement according to claim 1, wherein the pumping element is configured to pressurise the water to a corresponding pressure as the pressurized gas in the first compartment.

7. The piston arrangement according to claim 1, wherein the sealing ring is a first sealing ring and the sealing arrangement comprises a second sealing ring configured to be arranged to seal the piston to the cylinder wall and separating the second compartment from a third compartment.

8. The piston arrangement according to claim 1, wherein the water channel has a main extension in a fluid flow direction, and a cross section perpendicular to the main extension enclosed of internal walls of the piston.

9. A clean combustion engine according to claim 1, wherein the clean combustion engine is arranged and configured to combust a hydrogen-based fuel producing water as by-product in the exhausts, wherein the piston arrangement is arranged to utilize the by-product water in the water channel to lubricate the sealing ring.

10. The clean combustion engine according to claim 1, wherein the piston is a dual acting piston acting on a first side for combustion action, and on a second side opposite to the first side, for compression action.

11. A vehicle comprising a clean combustion engine according to claim.

12. The vehicle according to claim 11, further comprising a condenser arranged in downstream fluid communication with the clean combustion engine for receiving the exhausts, the condenser being configured to condense the exhausts to form a condensate of liquid water, wherein the liquid water is used in the water channel to lubricate the sealing ring.

* * * * *